United States Patent
Klatt (10) Patent No.: US 9,386,513 B2
(45) Date of Patent: Jul. 5, 2016

(54) METHOD FOR JOINT USE OF A RADIO ACCESS NETWORK BY SEVERAL MOBILE RADIO PROVIDERS

(75) Inventor: Axel Klatt, Köln (DE)

(73) Assignee: T-Mobile Deutschland GmbH, Bonn (DE)

(*) Notice: Subject to any disclaimer, the term of this patent is extended or adjusted under 35 U.S.C. 154(b) by 3248 days.

(21) Appl. No.: 10/565,912

(22) PCT Filed: Jul. 28, 2004

(86) PCT No.: PCT/EP2004/008430
§ 371 (c)(1),
(2), (4) Date: Jan. 2, 2007

(87) PCT Pub. No.: WO2005/013583
PCT Pub. Date: Feb. 10, 2005

(65) Prior Publication Data
US 2007/0161373 A1    Jul. 12, 2007

(30) Foreign Application Priority Data
Jul. 29, 2003   (DE) .................................. 103 34 872

(51) Int. Cl.
*H04W 48/18* (2009.01)
*H04W 48/12* (2009.01)

(52) U.S. Cl.
CPC .............. *H04W 48/18* (2013.01); *H04W 48/12* (2013.01)

(58) Field of Classification Search
CPC ..... H04W 48/18; H04W 24/00; H04W 28/18; H04W 48/16; H04W 60/00; H04W 76/04; H04W 76/045; H04W 84/042; H04W 88/06; H04W 88/10; H04W 8/18; H04W 92/02; H04W 92/14

USPC ............................... 455/435.2, 445; 370/353
See application file for complete search history.

(56) References Cited

U.S. PATENT DOCUMENTS

| | | | |
|---|---|---|---|
| 6,119,000 A * | 9/2000 | Stephenson et al. | 455/432.1 |
| 6,463,055 B1 * | 10/2002 | Lupien et al. | 370/353 |
| 6,567,667 B1 * | 5/2003 | Gupta et al. | 455/445 |
| 6,741,868 B1 * | 5/2004 | Park et al. | 455/552.1 |

(Continued)

OTHER PUBLICATIONS

Village, Worral, Crawford: "3G Sheared Infrastructure" 3G Mobile Communication Technologies Conference Publication No. 489 May 8, 2002-May 10, 2002.

(Continued)

*Primary Examiner* — Matthew Sams
(74) *Attorney, Agent, or Firm* — Cohen & Hildebrand, PLLC (57) ABSTRACT

A method for mobile radio suppliers to provide or share or jointly use a mobile radio access network is provided. Said method is characterized in that a single radio access network (9; 12), which is operated according to UMTS standard, cdma2000 standard, or GSM standard, for example, is jointly used by several mobile radio suppliers. In order to do so, the mobile radio networks comprise a common radio access network but separate core networks. Preferably several PLMN IDs are transmitted by the common radio access network and are made available to the user terminal for selection. The inventive method allows a joint radio access network to be made accessible to different mobile radio suppliers, a mobile radio user selecting one of several transmitted preferably PLMN IDs and using services (CS or PS) via the associated core network of the selected mobile radio operator.

17 Claims, 3 Drawing Sheets

(56) References Cited

U.S. PATENT DOCUMENTS

| | | | |
|---|---|---|---|
| 6,944,462 B2* | 9/2005 | Riihinen et al. | 455/453 |
| 7,110,788 B2* | 9/2006 | Park et al. | 455/552.1 |
| 7,236,784 B2* | 6/2007 | Johannesson et al. | 455/435.2 |
| 2002/0068565 A1* | 6/2002 | Purnadi et al. | 455/436 |
| 2002/0086670 A1* | 7/2002 | Rajaniemi et al. | 455/426 |
| 2003/0129971 A1* | 7/2003 | Gopikanth | 455/414 |
| 2003/0157937 A1* | 8/2003 | Oikarinen et al. | 455/445 |
| 2004/0162077 A1* | 8/2004 | Kauranen et al. | 455/445 |
| 2004/0224684 A1* | 11/2004 | Dorsey et al. | 455/434 |
| 2005/0090251 A1* | 4/2005 | Kuchibhotla et al. | 455/435.1 |
| 2005/0090255 A1* | 4/2005 | Kuchibhotla et al. | 455/435.2 |
| 2005/0111377 A1* | 5/2005 | Lioy et al. | 370/252 |

OTHER PUBLICATIONS

"Digital Cellular Telecommunication System (Phase 2+) Universal Mobile Telecommunication System (UMTS); Service aspect and requirements for network sharing (3GPP TR 22. 951 version 6.1.0 Release 6 )" ETSI Techinical Report Mar. 1, 2003 XP002317360 Sophia Antipolis, France.

* cited by examiner

METHOD FOR JOINT USE OF A RADIO ACCESS NETWORK BY SEVERAL MOBILE RADIO PROVIDERS

BACKGROUND OF THE INVENTION

The present invention relates to a method that allows several providers of mobile radio services to jointly use a radio access network of a mobile radio system. Several reasons (for example financial or regulatory) nowadays force mobile radio providers to efficiently utilize, jointly operate or share parts of the infrastructure for providing mobile radio services.

Figure 1:
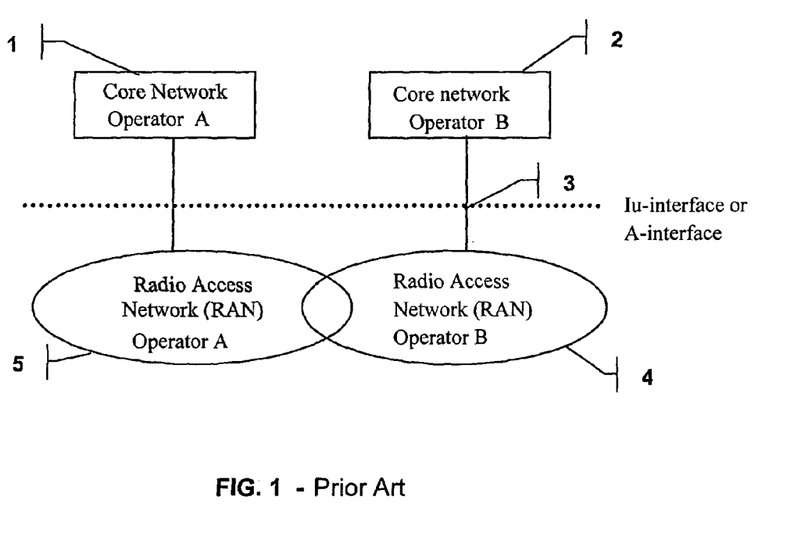
FIG. 1 shows schematically an exemplary architecture of two conventional mobile radio networks operating side-by-side.

The present state-of-the-art is reflected in national roaming agreements, where the mobile radio subscribers of one mobile radio operator are permitted to use the mobile access network and also the core network of the respective roaming partner. The methods for providing these roaming services are mainly based on standardized methods, for example of the 3GPP standard [www.3gpp.org]. In addition, the currently employed linkage between radio access network and the core network of a mobile radio provider makes it impossible to select another core network, for example a Mobile Switching Center (MSC) for providing circuit-switched (CS) connections, for example for voice connections, or another Serving GPRS Node (SGSN) for providing packet-switched (PS) connections, for example Internet access. The basic architecture of a conventional mobile radio network is shown in FIG. 1. The radio access networks (RAN) 4, 5 and the respective core networks (CN) 1, 2 of the mobile radio operator A and B are implemented in both (or several) mobile radio operators in parallel. If roaming agreements between the mobile radio operators exist, the mobile radio subscribers of operator A can, for example, use in areas without mobile radio service by operator A the mobile radio services of operator B via its radio access and core network 4, 2. However, in this case, the operator B provides all the services for the mobile radio subscriber of A. This situation has, inter alia, the disadvantage that the operators A and B must reconcile the rendered mobile radio services; however, operator B may not be able to offer all the services offered by operator A. Frequently, national roaming agreements, in which mobile radio operators lacking an equal market position may enter, may therefore be one-sided.

SUMMARY OF THE INVENTION

It is therefore an object of the present invention to enable a more efficiently utilization of the infrastructure of mobile radio networks of different operators to, on one hand, increase the economic value and, on the other hand, to better satisfy environmental requirements and regulations.

This object is solved by providing a method for providing or sharing or jointly using a mobile radio access network by several mobile radio providers, characterized in that a single radio access network, operating for example according to the UMTS, CDMA 2,000, or GSM standard, is jointly used by several mobile radio providers. Further, a system is provided for operating several mobile radio networks, characterized in that the mobile radio networks comprise a common radio access network, but separate core networks.

Preferred and advantageous embodiments of the invention disclosed by providing a method wherein in that network elements of a core network (Core Network, for example MSC and/or GSN) required for providing the mobile radio services are separately provided by each of the mobile radio providers. The method, including network elements of the core network (CN) are commonly used, for example, for providing voice connections (MSC), whereas other network elements for providing IP connections (packet network, GSN) are each provided by the different operators. Also, for differentiating between the core networks of the different mobile radio providers, the respective identity of the network operator (PLMN identity) is provided in the radio access network (RAN or BSS) to the mobile radio subscriber (UE or MS) by transmission of more than one mobile radio operator identity (PLMN identity). Also, more than one mobile radio operator identity (PLMN identity) is transmitted on an organization channel (for example the broadcast control channel—BCCH). Also, more than one PLMN identity is transmitted, for example, in the Master Information Block (MIB) on the BCCH of a mobile radio system operating according to the UMTS standard, or in System Information Type 3 (SI3) in a mobile radio system operating according to the GSM standard. Further, that more than one PLMN identity is transmitted in the Master Information Block (MIB) and the System Information Block 1 (SIB1) on the BCCH of a mobile radio system operating according to the UMTS standard. Further, more than one PLMN identity is transmitted in the System Information Block 1 (SIB1) on the BCCH of a mobile radio system operating according to the UMTS standard. In addition, more than one PLMN identity is transmitted in a different System Information Block other than the Master Information Block (MIB) and the System Information Block 1 (SIB1) on the BCCH of a mobile radio system operating according to the UMTS standard. Also, more than one PLMN identity is transmitted in a different block other than the System Information Type 3 (SI3) on the BCCH of a mobile radio system operating according to the GSM standard. When a connection is requested, the subscriber/the subscriber terminal (13) notifies the radio access network (9; 12) of the different core networks (6, 7; 10, 11) or PLMNs with which the connection is to be set up. When a connection is requested, the subscriber/the subscriber terminal (13) notifies the radio access network (9; 12) of the different core networks (6, 7; 10, 11) with which the connection is to be set up, and that this notification occurs with the transmission of the PLMN ID in the RRC CONNECTION REQUEST or the INITIAL DIRECT TRANSFER message in a mobile radio system operating according to the UMTS standard. When a connection is requested, the subscriber/the subscriber terminal (13) notifies the radio access network (9; 12) of the different core networks (6, 7; 10, 11) with which the connection is to be set up, and that this notification occurs with the transmission of the PLMN ID in the RRC CONNECTION REQUEST or the INITIAL DIRECT TRANSFER message in a mobile radio system operating according to the UMTS standard, wherein the PLMN identity is provided as MCC+MNC. When a connection is requested, the subscriber/the subscriber terminal (13) notifies the radio access network (9; 12) of the different core networks (6, 7; 10, 11) with which the connection is to be set up, and that this notification occurs with the transmission of the network operator ID (for example PLMN ID) in the RRC CONNECTION REQUEST or the INITIAL DIRECT TRANSFER message in a mobile radio system operating according to the UMTS standard, wherein only the MCC of the PLMN identity is transmitted.

Further, a system is provided wherein at least one of the mobile radio networks comprises a core network element (MSC or GSN) for CS and PS connections and a radio network control unit (RNC or BSC), and wherein one radio network control unit (RNC or BSC) is connected with more than one respective core network element (MSC or GSN) for CS and PS connections. The system may also include one radio access network (RAN) which is connected with more than one SGSN (for the PS domain). Further, one radio access network (RAN) is connected with more than one MSC (for the CS domain).

The method of the invention makes is possible to provide different mobile radio providers with access to a common radio access network. A mobile radio subscriber selects a single ID from several IDs, preferably PLMN IDs, which are transmitted by a common radio access network, and uses services (CS or PS) via the associated core network of the selected mobile radio operator. The present invention represents a significant improvement over the state-of-the-art, because it allows the use of a common radio access network (RAN) and provides separate core networks (CN) for the different mobile radio operators.

BRIEF DESCRIPTION OF THE DRAWINGS

Preferred embodiments of the invention will now be described with reference to the drawings.

DETAILED DESCRIPTION OF THE INVENTION

Figure 2:
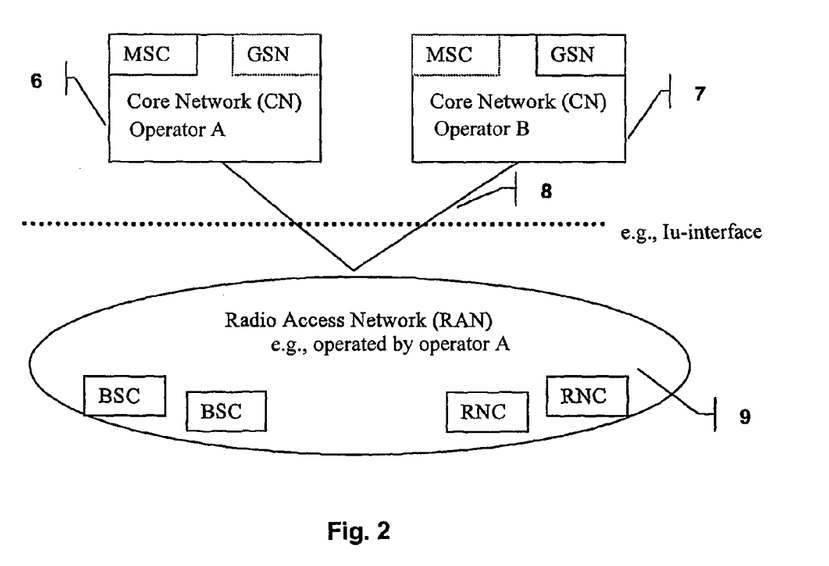
FIG. 2 shows the basic configuration or architecture of two mobile radio systems with a jointly used mobile radio access network according to the invention.

The present invention provides a basic configuration or architecture of the mobile radio access and core network, as shown in FIG. 2. In this embodiment, a single common radio access network 9, for example operating according to the UMTS or GSM standard, is connected to two (or more) core networks 6, 7, with the core network providing the services of the respective selected mobile radio operator to the mobile radio subscriber. However, this core network is accessed via the jointly used radio access network, whereas the service in the core network is separate. In a conventional system architecture depicted in FIG. 1, a mobile radio subscriber can obtain only the services of a single mobile radio provider, which depends on the employed radio access network 5 or 4 (the actual mobile radio operator is selected by selecting the radio access network). The respective radio access network must be switched when using the services of another mobile radio operator, because a conventional radio access network 5 or 4 permits access only to exactly one radio network 1 or 2 of the corresponding operator. A mobile radio subscriber then also has available only the PS and CS core network elements of the one radio access network operator.

The identity of the mobile radio operator is currently signaled to all potential mobile radio subscribers in the reception area of the radio access network by transmitting a so-called operator ID (Public Land Mobile Network Identity—PLMN ID) on an organization channel (Broadcast Control Channel—BCCH). Following activation, the subscriber terminal (mobile station "MS" in GSM, or user equipment "UE" in UMTS) selects the mobile radio network and requests services ("PLMN selection") from the selected mobile radio network following standardized procedures [e.g., 3GPP TS 22.011]. The selection of the mobile radio operators is based on the existence of a unique ID (PLMN ID) on the BCCH of each mobile radio access network. Conventional systems are not capable of transmitting more than one mobile radio network operator ID (PLMN ID) on the BCCH of a mobile radio access network.

Conversely, with the method according to the invention, the mobile radio subscriber or, in automatic mode [e.g., 3GPP TS 23.122], the subscriber terminal itself can select the core network, and thereby the desired mobile radio operator, based on the transmission of additional PLMN IDs on the BCCH of the radio access network, without having to switch between radio access networks. According to the invention, several core networks are connected to one radio access network.

Figure 3:
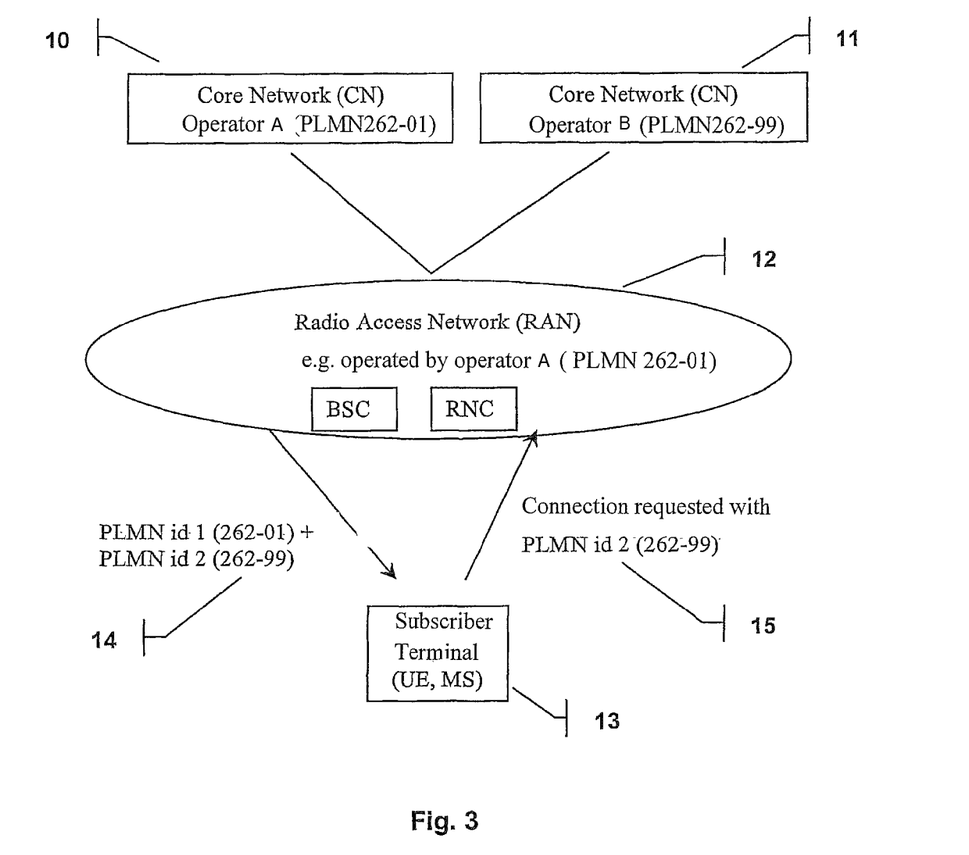
FIG. 3 shows an embodiment of the system according to FIG. 2.

This is the basic principle of the inventive method and is depicted in FIG. 3.

Figure 4A:
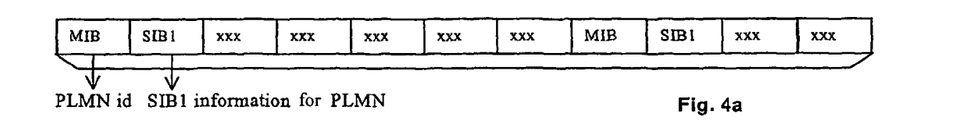
FIG. 4a shows conventional MIB and SIB1 transmission on BCCH.

Transmission of the PLMN ID 14 of the radio access network 12 and thus of the operator of the mobile radio system is described, for example, in [3GPP TS 04.18] for a system operating according to the GSM standard, and in [3GPP TS 25.331] for a mobile radio system operating according to the UMTS standard. Both standards use the organization channel (BCCH) for transmitting this information. In a mobile radio system operating according to the GSM standard, the PLMN ID is transmitted in System Information type 3; in a mobile radio system operating according to the UMTS standard, in Master Information Block (MIB). Both systems have in common that network ID (PLMN ID) are comprised of a sequence of numbers (digits) having the format "abc-zyx." "abc" herein designates a so-called Mobile Country Code (MCC) which indicates to the subscriber terminal 13 the applicable country (for example "262" for Germany), whereas "xyz" indicates the Mobile Network Code (MNC) for the various mobile radio operators within a country (for example "01" for T-Mobile D in Germany). In many other countries MNCs can have 2 or 3 digits. The systems operating according to the UMTS and GSM standards having common that the PLMN ID repeats on the organization channel BCCH on a regular basis, so that mobile radio terminals 13 have information available about the identity of the mobile radio network within a reasonably time. For example, in the UMTS standard, the MIB is repeated every 8 BCCH-blocks, as indicated in FIG. 4a.

According to [3GPP TS 25.331], the MIB for the BCCH has the following structure:

|MIB
  - - >PLMN id
  - - >MCC
    - - >MNC
|(Other Information)

With this conventional structure (3GPP TS 25.331), only a single mobile radio network ID 14, i.e., a combination of MCC & MNC can be transmitted to the subscriber terminal 13.

According to the method of the invention, more than one PLMN ID can be transmitted in the MIB, so that several core networks 10, 11 can be announced over a common radio access network 12 and reached by a subscriber terminal 13.

A MIB according to the method of the invention could, for example, have the following structure:

|MIB
   - - >PLMN id1
      - - >MCC
         - - >MNC
   - - >PLMN id2
      - - >MCC
         - - >MNC
   - - >PLMN id"n"1
      - - >MCC
         - - >MNC
|(Other Information)

Figure 4B:
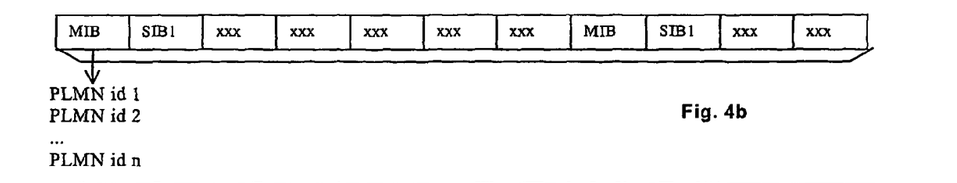
FIG. 4b shows additional PLMN IDs transmitted in the MIB on the BCCH.
Figure 4C:
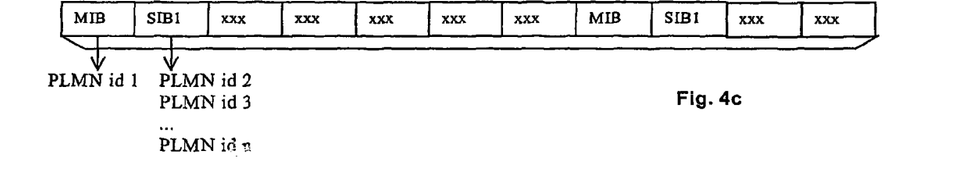
FIG. 4c shows additional PLMN IDs transmitted in the SIB1.
Figure 4D:
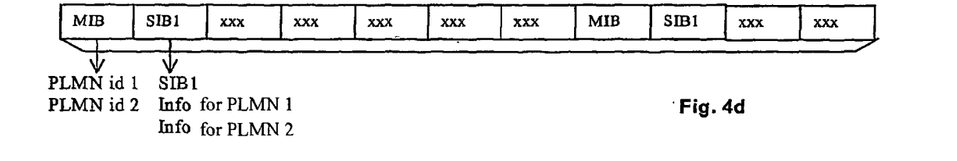
FIG. 4d shows additional PLMN IDs transmitted in the MIB and additional SIB1 per PLMN.
Figure 4E:
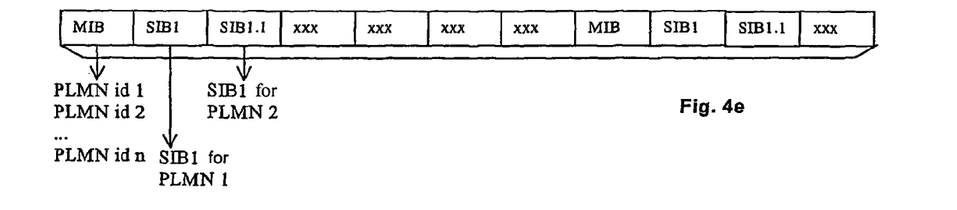
FIG. 4e shows additional PLMN IDs transmitted in the MIB and additional SIB1 per PLMN for each supported PLMN.
Figure 4F:
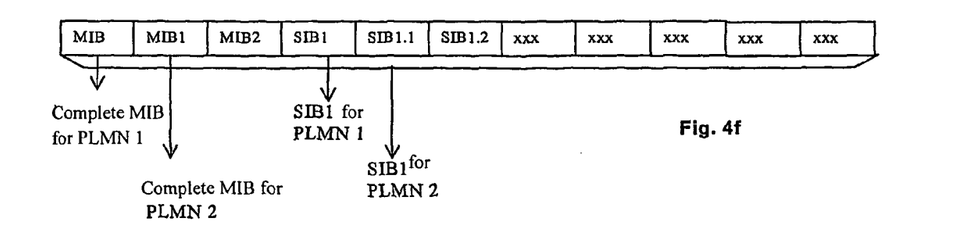
FIG. 4f shows introduction of entirely new MIBs and SIB1 for each supported PLMN.

With this structure of the MIB on the organization channel BCCH, more than one PLMN ID can be transmitted to each subscriber terminal within the mobile radio access network for selection (illustrated in FIG. 4b). Alternatively to the announcement of additional PLMN IDs, a different System Information Block (SIB) of the BCCH can be used, for example the System Information Block 1 (SIB1), as shown in FIG. 4c. This block is typically used to announce core network information [3GPP TS 25.331]. In principle, the information can here also be expanded by additional PLMN IDs, for example by transmitting in the SIB1 the PLMN ID 2, PLMN ID 3, etc. Moreover, one or several additional MIBs can be defined which include all the information of conventional methods for the respective additional PLMN IDs (FIG. 4f).

According to an additional important feature of the present invention, the exclusivity of the selected mobile radio operator is maintained. In other words: a mobile radio terminal 13 must select a single mobile radio operator from the offered number of mobile radio operators which then provides the services. This does not prevent the mobile radio terminal (or the user) 13 from switching the mobile radio operator 10, 11; however, the mobile access network 12 itself is not switched.

Conventional systems have the additional disadvantage that they are unable to indicate to the radio access network control unit (in UMTS: Radio Network Controller—RNC; in GSM: Base Station Controller—BSC) the particular core network 10, 11 to which a mobile radio terminal 13 wants to be connected. The RNC/BSC must be informed upon registration, with which of the possible core networks (which in this case are synonymous with mobile radio operators) 10, 11 the registration should be completed. The RNC/BSC sets up the connection to the corresponding core networks 10, 11 based on the selection by the subscriber terminal 13 (for example via the Iu-interface 8 in UMTS systems), with registration then implemented according to the conventional UMTS and GSM standard, respectively.

As described above, the subscriber terminal 13 must be informed of the existence of several core networks 10, 11 or mobile radio operators within a radio access network 12 and must have made a decision to register with a single network, based on the PLMN identity. The subscriber terminal must also inform the RNC/BSC 15 during the registration process of the selection among the possible mobile radio operators 10, 11 (based on the PLMN ID). Various implementation modes are feasible:

To register a subscriber terminal 13 in a mobile radio network 10 or 11, a subscriber terminal 13 must communicate with the radio access network control unit (RNC/BSC) (in 12). In conventional mobile radio systems, the radio access network control unit (RNC/BSC) (in 12) does not need to be informed of the selected PLMN 10 or 11, since only one possibility exist for the core network 10, 11, because the entire core network is operated by the operator of the radio access network. Conversely, with the inventive method, the radio access network control unit (RNC/BSC) (in 12) must also be informed of the core network elements 10 or 11, to which a connection is to be set up for the purpose of registration.

In UMTS systems, the subscriber terminal 13 sets up the connection via a RRC CONNECTION REQUEST message [3GPP TS 25.331], which can advantageously be used to transmit 15 the identification of the selected PLMNs 10 or 11, i.e., of the mobile radio operator, from the subscriber terminal 13 to the radio access network control unit (RNC/BSC) (in 12). The information about the selected PLMN must be transmitted 15 in this message or in another message, for example, in the form of MCC or MNC. In another less complex method which conserves resources, the selected PLMN is indicated by a reference association with the transmission of the additional PLMNs on the BCCH. For example, an 8-bit sequence of 3 bits can be used to address 8 different PLMNs. The reference could refer hereby, for example, to the sequential order in which the PLMN IDs are transmitted on the organization channel BCCH. For example, if the three PLMNs (PLMN0, PLMN1, and PLMN2) are transmitted on the organization channel BCCH which jointly use the radio access network 12, then a bit sequence of "010" would indicate that the subscriber terminal 13 requests connection to PLMN2. Support of up to 8 core networks (similar to 10 or 11) is sufficient for practical applications and from an operative standpoint. However, the method can advantageously be used for any number of supported core networks or mobile radio providers. In another alternative embodiment, a single bit can be used to indicate the "default" core network, which can be derived directly from the IMSI ("International mobile subscriber identity") of the subscriber terminal. An optional signaling default ("yes"/"no") would then have to be included in the signal transmission from the subscriber terminal to the mobile radio access network, whereafter the RNC sets up the connection with the core network or the network operator based on the IMSI of the subscriber terminal. Default signaling or complete signaling of the desired core network (mobile radio provider) can be controlled on the organization channel (BCCH) of the radio access network, for example, by a single bit or by another implementation.

With the method of the invention, different core network parameter sets can be provided by using additional System Information Blocks (SIB1) on the organization channel BCCH of a mobile radio network. This information may include, for example, information required for communication with the core network which may be different depending on the type of the core network. Additional BIB1s (e.g., SIB1.1, SIB1.2, etc., or SIB1bis, SIB1ter) must then be set up on the BCCH, by which a dedicated set of (potentially different) core network parameters for each of the supported core networks 10 or 11 can be provided to the potential subscriber terminals 13 via a common radio access network 12, as shown in FIG. 4e and FIG. 4f. Based on the selection of the mobile radio operator on the basis of the PLMN IDs 14 transmitted in the common radio access network 12, the subscriber terminal 13 reads only the required information for the selected PLMN from the respective SIB1.

In an alternative embodiment of the inventive a method, one or several alternative dedicated mobile radio network operator IDs (PLMN IDs) are provided (as in 14). In this case, the organization channel BCCH of the radio access network 12 is not used to transmit additional PLMN IDs, but the information about additional possible PLMNs is instead provided to the subscriber terminal 13 by using, for example, one of the subscriber terminal—network communication procedures commonly used in GSM or UMTS, such as the registration procedure, the "PDP context activation" or the "location registration" procedure. With the novel method of the invention, the additional mobile radio operator IDs for each individual mobile radio terminal 13 can advantageously be transmitted separately, and the corresponding lists of the potential mobile radio network operators for each subscriber terminal-network association can be provided.

In principle, different possibilities exist for additional use of the information about additional mobile radio operators:

For example, a subscriber terminal 13 can receive information that a group of mobile radio networks (PLMNs) can be regarded as a common network. The subscriber terminal 13 can then switch between cells in different radio access networks based on the "cell reselection" parameters transmitted on the organization channel BCCH, for example according to the UMTS or GSM standard, in the same way as if these cells were to belong to a single mobile radio access network 4, 5 or core network 1, 2 (mobile radio operator).

In an alternative embodiment, the information transmitted to the subscriber terminal is used for selecting and transmitting the connection request in the same manner as described above with reference to FIG. 3. The information about the connection request with another mobile radio network operator would be indicated 15 to the registered mobile radio network operator (actual operator), who would then be able to provide access to the core net of another mobile radio network operator via his own radio access network. Alternatively, the services could also be provided by the actual registered mobile radio network operator, however, the services would then be reconciled based on the transmitted connection request (like a "call-by-call" for mobile radio services). Similar methods are presently used in landline telephony where the actual core network operator is selected by transmitting a specific "pre-prefix." For example, the radio access network control unit (RNC or BSC) can use transmission of the desired mobile radio network operator ID (PLMN ID) according to one of the aforedescribed methods to set up the corresponding connections to one of the possible core networks in accordance with the selection, or this information can be processed in the billing system of the mobile radio provider.

LISTS OF REFERENCE SYMBOLS 1. core network operator A
2. core network operator B
3. interface (Iu or A interface)
4. radio access network operator B
5. radio access network operator A
6. core network operator A
7. core network operator B
8. interface
9. common radio access network
10. core network operator A
11. core network operator B
12. common radio access network
13. subscriber terminal
14. transmission PLMN ID
15. selection PLMN

The invention claimed is:

1. A method for providing or sharing or jointly using a single mobile radio access network by several mobile radio providers, comprising the steps of:
providing the single radio access network (9; 12) for joint use by the several mobile radio providers, wherein for differentiating between a plurality of core networks (6, 7; 10, 11) of the different mobile radio providers, a respective identity of the network operator (PLMN identity) is provided in the radio access network to a mobile radio subscriber (UE or MS) by transmitting more than one mobile radio operator identity, PLMN identity, on a single organization channel BCCH;
transmitting the more than one PLMN identity in a mobile radio system;
wherein network elements of the core network (6, 7; 10, 11) (CN) are used for providing voice connections, whereas other network elements for providing IP connections (packet network) are each provided by the different operators.

2. A method for providing or sharing or jointly using a single mobile radio access network by several mobile radio providers, comprising the steps of:
providing the single radio access network (9; 12) for joint use by the several mobile radio providers, wherein for differentiating between a plurality of core networks (6, 7; 10, 11) of the different mobile radio providers, a respective identity of the network operator (PLMN identity) is provided in the radio access network to a mobile radio subscriber (UE or MS) by transmitting more than one mobile radio operator identity, PLMN identity, on a single organization channel BCCH;
transmitting the more than one PLMN identity in a mobile radio system;
wherein when a connection is requested, the subscriber/the subscriber terminal (13) notifies the radio access network (9; 12) of the different core networks (6, 7; 10, 11) or PLMNs with which the connection is to be set up.

3. A method for providing or sharing or jointly using a single mobile radio access network by several mobile radio providers, comprising the steps of:
providing the single radio access network (9; 12) for joint use by the several mobile radio providers, wherein for differentiating between a plurality of core networks (6, 7; 10, 11) of the different mobile radio providers, a respective identity of the network operator (PLMN identity) is provided in the radio access network to a mobile radio subscriber (UE or MS) by transmitting more than one mobile radio operator identity, PLMN identity, on a single organization channel BCCH;
transmitting the more than one PLMN identity in a mobile radio system;
wherein when a connection is requested, the subscriber/the subscriber terminal (13) notifies the radio access network (9; 12) of the different core networks (6, 7; 10, 11) with which the connection is to be set up, and that this notification occurs with the transmission of the PLMN ID in the RRC CONNECTION REQUEST or the INITIAL DIRECT TRANSFER message in a mobile radio system operating according to a UMTS standard.

4. A method for providing or sharing or jointly using a single mobile radio access network by several mobile radio providers, comprising the steps of:
providing the single radio access network (9; 12) for joint use by the several mobile radio providers, wherein for differentiating between a plurality of core networks (6, 7; 10, 11) of the different mobile radio providers, a respective identity of the network operator (PLMN identity) is provided in the radio access network to a mobile radio subscriber (UE or MS) by transmitting more than one mobile radio operator identity, PLMN identity, on a single organization channel BCCH;
transmitting the more than one PLMN identity in a mobile radio system;
wherein when a connection is requested, the subscriber/the subscriber terminal (13) notifies the radio access network (9; 12) of the different core networks (6, 7; 10, 11) with which the connection is to be set up, and that this notification occurs with the transmission of the PLMN ID in the RRC CONNECTION REQUEST or the INITIAL DIRECT TRANSFER message in a mobile radio system operating according to a UMTS standard, wherein the PLMN identity is provided as MCC+MNC.

5. A method for providing or sharing or jointly using a single mobile radio access network by several mobile radio providers, comprising the steps of:
providing the single radio access network (9; 12) for joint use by the several mobile radio providers, wherein for differentiating between a plurality of core networks (6, 7; 10, 11) of the different mobile radio providers, a respective identity of the network operator (PLMN identity) is provided in the radio access network to a mobile radio subscriber (UE or MS) by transmitting more than one mobile radio operator identity, PLMN identity, on a single organization channel BCCH;
transmitting the more than one PLMN identity in a mobile radio system;
wherein when a connection is requested, the subscriber/the subscriber terminal (13) notifies the radio access network (9; 12) of the different core networks (6, 7; 10, 11) with which the connection is to be set up, and that this notification occurs with the transmission of the network operator ID (PLMN ID) in the RRC CONNECTION REQUEST or the INITIAL DIRECT TRANSFER message in a mobile radio system operating according to a UMTS standard, wherein only a MNC of the PLMN identity is transmitted.

6. A method for providing or sharing or jointly using a single mobile radio access network by several mobile radio providers, comprising the steps of:
providing the single radio access network (9; 12) for joint use by the several mobile radio providers, wherein for differentiating between a plurality of core networks (6, 7; 10, 11) of the different mobile radio providers, a respective identity of the network operator (PLMN identity) is provided in the radio access network to a mobile radio subscriber (UE or MS) by transmitting more than one mobile radio operator identity, PLMN identity, on a single organization channel BCCH;
transmitting the more than one PLMN identity in a mobile radio system;
wherein when a connection is requested, the subscriber/the subscriber terminal (13) notifies the radio access network (9; 12) of the different core networks (6, 7; 10, 11) with which the connection is to be set up, and that this notification occurs with the transmission of the network operation ID (PLMN ID) in the RRC CONNECTION REQUEST or the INITIAL DIRECT TRANSFER message in a mobile radio system operating according to a UMTS standard, wherein the PLMN identity is represented by an integer (1, 2, 3 . . . n) or a bit string (e.g., "001"), and the actual PLMN identity is determined from the sequential order of transmission of the different PLMN identities on the BCCH.

7. A method for providing or sharing or jointly using a single mobile radio access network by several mobile radio providers, comprising the steps of:
providing the single radio access network (9; 12) for joint use by the several mobile radio providers, wherein for differentiating between a plurality of core networks (6, 7; 10, 11) of the different mobile radio providers, a respective identity of the network operator (PLMN identity) is provided in the radio access network to a mobile radio subscriber (UE or MS) by transmitting more than one mobile radio operator identity, PLMN identity, on a single organization channel BCCH;
transmitting the more than one PLMN identity in a mobile radio system;
wherein when a connection is requested, the subscriber/the subscriber terminal (13) notifies the radio access network (9; 12) of the different core networks (6, 7; 10, 11) with which the connection is to be set up, and that this notification occurs with the transmission of the network operator ID (PLMN ID) neither in the RRC CONNECTION REQUEST nor the INITIAL DIRECT TRANSFER message in a mobile radio system operating according to a UMTS standard.

8. A method for providing or sharing or jointly using a single mobile radio access network by several mobile radio providers, comprising the steps of:
providing the single radio access network (9; 12) for joint use by the several mobile radio providers, wherein for differentiating between a plurality of core networks (6, 7; 10, 11) of the different mobile radio providers, a respective identity of the network operator (PLMN identity) is provided in the radio access network to a mobile radio subscriber (UE or MS) by transmitting more than one mobile radio operator identity, PLMN identity, on a single organization channel BCCH;
transmitting the more than one PLMN identity in a mobile radio system;
wherein the more than one PLMN ID is transmitted in a System Information Block 1 (SIB1) on the BCCH of a mobile radio system operating according to a UMTS standard or core network information of more than one core network is transmitted within an SIB1.

9. A method for providing or sharing or jointly using a single mobile radio access network by several mobile radio providers, comprising the steps of:
providing the single radio access network (9; 12) for joint use by the several mobile radio providers, wherein for differentiating between a plurality of core networks (6, 7; 10, 11) of the different mobile radio providers, a respective identity of the network operator (PLMN identity) is provided in the radio access network to a mobile radio subscriber (UE or MS) by transmitting more than one mobile radio operator identity, PLMN identity, on a single organization channel BCCH;
transmitting the more than one PLMN identity in a mobile radio system;
wherein a signal represented by a single bit is transmitted on the organization channel (BCCH) of the radio access network (9; 12) to indicate if the radio access network resources administration unit provides the connection request of the subscriber/the subscriber terminal (13) with one of the core networks (6, 7; 10, 11) based on a IMSI of the subscriber terminal ("default" selection based on the subscriber IMSI).

10. A method for providing or sharing or jointly using a single mobile radio access network by several mobile radio providers, comprising the steps of:
providing the single radio access network (9; 12) for joint use by the several mobile radio providers, wherein for differentiating between a plurality of core networks (6, 7; 10, 11) of the different mobile radio providers, a respective identity of the network operator (PLMN identity) is provided in the radio access network to a mobile radio subscriber (UE or MS) by transmitting more than one mobile radio operator identity, PLMN identity, on a single organization channel BCCH;

transmitting the more than one PLMN identity in a mobile radio system;
wherein a signal represented by a single bit is transmitted on the organization channel (BCCH) of the radio access network (9; 12) to indicate if the radio network resources administration unit provides the connection request of the subscriber/the subscriber terminal (13) with one of the core networks (6, 7; 10, 11) based on a IMSI of the subscriber terminal ("default" selection based on the subscriber IMSI), and the "default" signaling is selected based on the IMSI, or the mobile radio network operator ID (e.g., PLMN ID) is transmitted by signaling one bit on the organization channel (BCCH).

11. A method for providing or sharing or jointly using a single mobile radio access network by several mobile radio providers, comprising the steps of:
providing the single radio access network (9; 12) for joint use by the several mobile radio providers, wherein for differentiating between a plurality of core networks (6, 7; 10, 11) of the different mobile radio providers, a respective identity of the network operator (PLMN identity) is provided in the radio access network to a mobile radio subscriber (UE or MS) by transmitting more than one mobile radio operator identity, PLMN identity, on a single organization channel BCCH;
transmitting the more than one PLMN identity in a mobile radio system;
wherein additional PLMN IDs are always transmitted when a subscriber terminal (13) logs on to a mobile radio network for the purpose of registration, actually uses a service, or indicates its actual location to the mobile radio network.

12. A method for providing or sharing or jointly using a single mobile radio access network by several mobile radio providers, comprising the steps of:
providing the single radio access network (9; 12) for joint use by the several mobile radio providers, wherein for differentiating between a plurality of core networks (6, 7; 10, 1) of the different mobile radio providers, a respective identity of the network operator (PLMN identity) is provided in the radio access network to a mobile radio subscriber (UE or MS) by transmitting more than one mobile radio operator identity, PLMN identity, on a single organization channel BCCH;
transmitting the more than one PLMN identity in a mobile radio system;
wherein the selection of the PLMN or of these core network elements is based on signaling default (yes or no) the selection by the subscriber terminal (13), based on the signaled PLMN ID.

13. A method for providing or sharing or jointly using a single mobile radio access network by several mobile radio providers, comprising the steps of:
providing the single radio access network (9; 12) for joint use by the several mobile radio providers, wherein for differentiating between a plurality of core networks (6, 7; 10, 11) of the different mobile radio providers, a respective identity of the network operator (PLMN identity) is provided in the radio access network to a mobile radio subscriber (UE or MS) by transmitting more than one mobile radio operator identity, PLMN identity, on a single organization channel BCCH;
transmitting the more than one PLMN identity in a mobile radio system;
wherein network elements of the core network (6, 7; 10, 11) (CN) are used for providing voice connections, whereas other network elements for providing IP connections (packet network) are each provided by the different operators;
wherein network elements of the core network (6, 7; 10, 11) (CN) are commonly used for providing voice connections (MSC).

14. A method for providing or sharing or jointly using a single mobile radio access network by several mobile radio providers, comprising the steps of:
providing the single radio access network (9; 12) for joint use by the several mobile radio providers, wherein for differentiating between a plurality of core networks (6, 7; 10, 11) of the different mobile radio providers, a respective identity of the network operator (PLMN identity) is provided in the radio access network to a mobile radio subscriber (UE or MS) by transmitting more than one mobile radio operator identity, PLMN identity, on a single organization channel BCCH;
transmitting the more than one PLMN identity in a mobile radio system;
wherein additional PLMN IDs are always transmitted when a subscriber terminal (13) loss on to a mobile radio network for the purpose of registration, actually uses a service, or indicates its actual location to the mobile radio network;
wherein the service is in the context of a "PDP context activation".

15. A method for providing or sharing or jointly using a single mobile radio access network by several mobile radio providers, comprising the steps of:
providing the single radio access network (9; 12) for joint use by the several mobile radio providers, wherein for differentiating between a plurality of core networks (6, 7; 10, 11) of the different mobile radio providers, a respective identity of the network operator (PLMN identity) is provided in the radio access network to a mobile radio subscriber (UE or MS) by transmitting more than one mobile radio operator identity, PLMN identity, on a single organization channel BCCH;
transmitting the more than one PLMN identity in a mobile radio system;
wherein additional PLMN IDs are always transmitted when a subscriber terminal (13) logs on to a mobile radio network for the purpose of registration, actually uses a service, or indicates its actual location to the mobile radio network;
wherein the actual location to the mobile radio network is for moving subscriber terminals, through location registration procedures.

16. A method for providing or sharing or jointly using a single mobile radio access network by several mobile radio providers, comprising the steps of:
providing the single radio access network (9; 12) for joint use by the several mobile radio providers, wherein for differentiating between a plurality of core networks (6, 7; 10, 11) of the different mobile radio providers, a respective identity of the network operator (PLMN identity) is provided in the radio access network to a mobile radio subscriber (UE or MS) by transmitting more than one mobile radio operator identity, PLMN identity, on a single organization channel BCCH;
transmitting the more than one PLMN identity in a mobile radio system;
wherein the more than one PLMN ID is transmitted in System Information Type 3 (SI3) according to a GSM standard.

17. A method for providing or sharing or jointly using a single mobile radio access network by several mobile radio providers, comprising the steps of:
- providing the single mobile radio access network (9; 12) for joint use by several mobile radio providers, wherein for differentiating between a plurality of core networks (6, 7; 10, 11) of the different mobile radio providers, a respective identity of the network operator (PLMN identity) is provided on a single organization channel BCCH;
- transmitting on the single organization channel BCCH more than one PLMN identity in a mobile radio system; wherein when transmitting a connection request to the radio access network (9; 12) the subscriber/the subscriber terminal (13) selects a PLMN identity from the PLMN identities transmitted on the single BCCH channel, with which of the different core networks (6, 7; 10, 11) or PLMNs, respectively, the connection is to be set up, without changing the radio access network (9; 12);
- wherein the more than one PLMN ID is transmitted in System Information Type 3 (SI3) according to a GSM standard.

\* \* \* \* \*